July 11, 1950 K. MÜLLER 2,514,716
APPARATUS FOR TESTING GEARS
Filed May 11, 1945

INVENTOR:
Karl Müller
by Sommers & Young
Attorneys

Patented July 11, 1950

2,514,716

UNITED STATES PATENT OFFICE 2,514,716

APPARATUS FOR TESTING GEARS

Karl Müller, Zurich, Switzerland, assignor to Maag-Zahnräder und-Maschinen Aktiengesellschaft, Zurich, Switzerland Application May 11, 1945, Serial No. 593,221
In Germany April 28, 1944

4 Claims. (Cl. 73—162)

This invention relates to apparatus for testing gears by the method of unilateral gear tooth rolling motion control.

It is known that with this kind of control only those tooth flanks are tested which are intermittently effective in the respective direction of rotation of the gear. The ascertaining of errors of configuration is effected in such fashion that the axes of a pair of intermeshing gears are connected with each other by means of two disc-like testing members which have the same ratio of gearing as the two test specimens and that one of the gears is arranged for effecting relative to the other, in addition to the predetermined rotational movement, a separate movement which is recorded in curve form by an indicating device if erroneous configuration has occurred.

In a known measuring apparatus of this kind, one of the gears is loosely mounted on its carrier axle and the additional rotative movements taking place between the gear and the axle that are due to erroneous configuration are recorded in arcuate form.

It is further known to record the erroneous configurations on the test specimens in rectilinear form by one of the gears gyrating about the other in planetary manner in which arrangement the immovable gear performs only the small movements that are due to erroneous configurations and are recorded by a suitable indicating device rectilinearly. The constructions of the conventional apparatus are on the whole of relatively complicated nature.

The apparatus forming the object of the present invention operates by measuring the erroneous configurations of either side of the gear teeth, in such manner, that one of the test specimens performs lateral swinging movements relative to the other by the amount of the erroneous configurations. These relative movements are carried into effect in that the two disc-like testing members are interconnected by a band like motion-transmitting means, for example, a thin steel band which is guided so as to pass over two sheaves, in such manner, that one of the test specimens can perform lateral displacing movements commensurate with the erroneous configurations of the tooth system. Advantageously, the displaceable test specimen is mounted on a slide the displacing movements of which are indicated in visual manner by an indicating device in multiplied proportion.

The embodiments of the present invention are illustrated, by way of example only, in the accompanying drawings, in which Fig. 1 shows an elevation of the apparatus partly in section;

Figure 1:
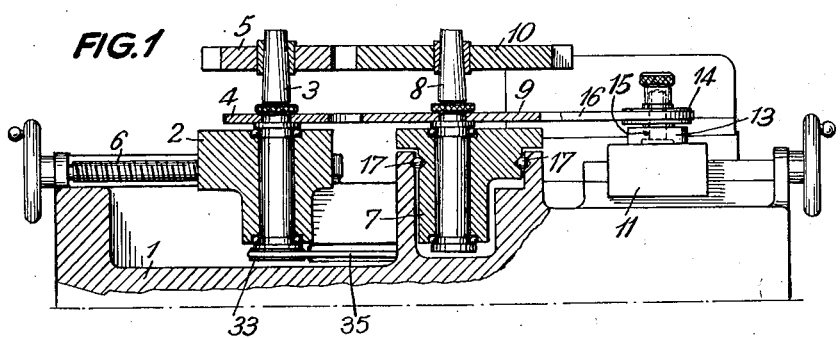

On the bed 1 of the apparatus (Figs. 1 and 2) a slide 2 is arranged which is adjustable by means of a feed screw 6. This slide has an axle 3 rotatably mounted therein to which are firmly clamped a testing member 4 and a gear 5 true to center. A second slide 7 is guided in the bed 1 by means of ball races 17 so as to be movable transversely of the longitudinal axis of the bed 1. This slide also has a rotatable axle 8 carrying a testing member 9 and a gear 10 in fixed relation thereto. On the bed 1 is further arranged a third slide 11 which is displaceable longitudinally of said slide by means of a feed screw 12.

On the said slide a holder 13 is fastened which carries two disc-like cylindrical sheaves 14 which are adjustable transversely of the direction of movement of the slide and can be fixed in the adjusted position by means of screws 15. Around the four rotatable cylindrical discs 4, 9 and 14, 14 passes a thin steel band 16, as shown in Fig. 1. Advantageously, but not indispensably, the adjustment of position of the two sheaves 14 is so effected that the band sections e extend parallel with each other and are situated in a plane which passes through the axes of the two axles 3 and 8.

At one end of the slide 7 a stop pin 18 is arranged which is in contacting engagement with a lever 19 which transmits its movements to a scriber carrier lever 20. Springs 21 function to maintain the two levers in bearing engagement with each other and with the pin 18 at all times. On the other end of the slide 7 a driving member 22 is disposed which can be brought into engagement with springs 23 by displacing a fork 24. By this means the movable slide 7 can be subjected to pressure in both directions selectively, at will.

Figure 3:
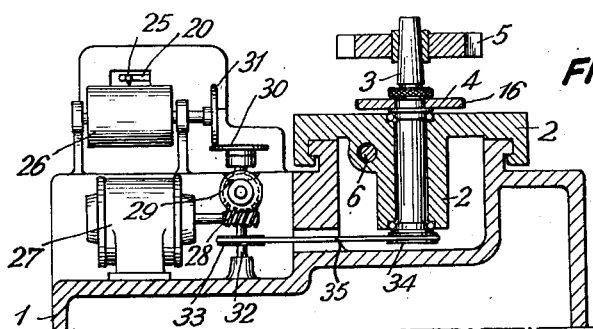
Fig. 3 shows an elevation of the recording device having indicator drum driving means of a variable ratio of gearing.

The lever 20 the outer end of which is provided with a scriber 25 traces the curve produced by the spring play on a sheet of plotting paper which is tautened against a drum 26, as shown in Figs. 1 and 3. This drum has driving movement imparted thereto by a motor 27 via a worm drive 28, a bevel wheel drive 29 and an adjustable friction drive 30, 31 by means of which the velocity of feeding of the paper can be varied. At the same time the countershaft 32 drives by means of discs 33, 34 that are connected by a driving belt 35, also the axle 3 and thus the testing members 4 and the gear 5.

Figure 2:
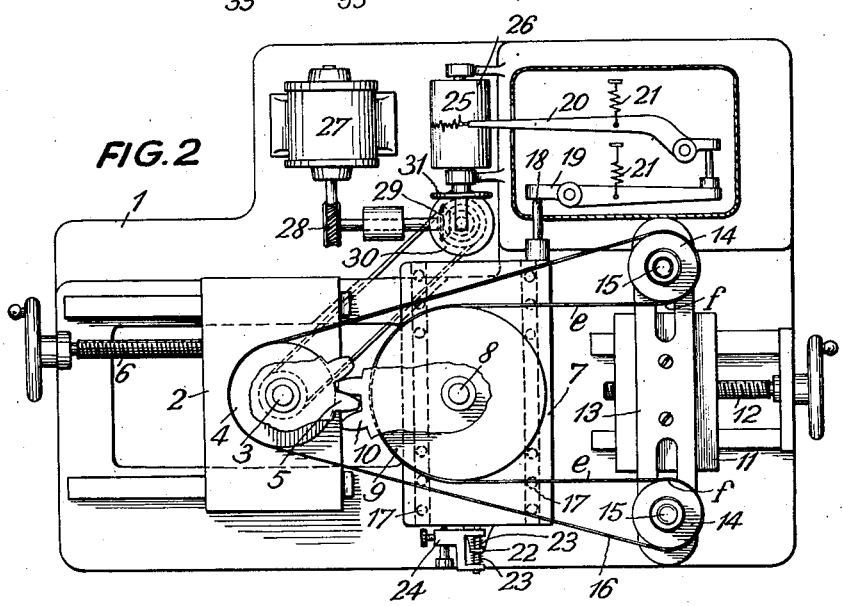
Fig. 2 is a top plan view of the apparatus.

In Fig. 2 the general arrangement is so chosen that of the gears 5 and 10 intermittently the right hand tooth flanks contact with each other, while between the left hand tooth flanks the play exists which corresponds to the spacing of the axles as adjusted. If then the axle 3 is rotated by the motor, the steel band 16 being tightly tautened by means of the screw 12 transmits the rotational movement uniformly to the testing member 9 and the gear 10. If desired, the last named parts may either both constitute gears, such as 5 and 10, or one of said parts may be a model test wheel in connection with which erroneous configurations that may arise will be attributed to the test specimen as belonging thereto all alone.

Now the angular velocity of the axle 8 corresponds to that of the axle 3 as reduced proportionally to the relative dimensions of the discs 4 and 9. If then the gear 10 constitutes a test specimen which has portions of erroneous configuration and the tooth flanks of which bear against the flanks of a gear constituting a countergear 5 under the pressure of the spring 23 these erroneous portions cause small displacements of the gear 10 at right angles to the plane passing through the axes of the two axles 3 and 8.

These deviating movements are made possible by the two wholly or approximately parallel band sections $e$. If these are parallel the gear 10 performs a displacing movement devoid of a conjoint rotational movement, but if they diverge this wheel performs an additional concomitant small rotation. However, in any event the gear 10 performs a swinging movement about the points of engagement of the band sections $e$, $e$ with the sheaves 14. The displacements of the gear 10 and consequently those of the axle 8, that is, of the slide 7 are transmitted in correspondingly multiplied proportion to the scriber carrier lever 20. The motor 27 rotates at the same time the drum 26 in conjunction with the two gears 5 and 10. From the angular ranges of displacement of the scriber 25 and of the rotating drum a curve of erroneous configurations is obtained the length of which can be adapted to the size of the test specimen by means of the adjustable drive 30, 31.

I claim:

1. In an apparatus for testing gears, two rotatable supporting means adapted each to support a gear intermeshing with the other gear at a certain ratio of gearing, a pulley connected to each of said gear supporting means for rotating said gears in opposite directions to each other at a ratio of gearing corresponding to that of said supporting means, slide means carrying one of said gear supporting means for shifting the pulley member carried thereby relative to the other in a direction perpendicular to a plane extending through the axes of rotation of said supporting means, commensurate with any deviations of the gear to be tested from true tooth configuration, an endless tape-like movement transmission means passing round each of said pulley members and around two associated tape sheaves for effecting said shifting movements, and an indicating device adapted to receive said movement of said slide means and having motion multiplying mechanism for visually indicating said shifting movements in multiplied proportion.

2. In an apparatus for testing gears, two rotatable supporting means adapted each to support a gear intermeshing with the other gear at a certain ratio of gearing, a pulley connected to each of said gear supporting means for rotating said gears in opposite directions to each other at a ratio of gearing corresponding to that of said supporting means, slide means carrying one of said gear supporting means for shifting the pulley member carried thereby relative to the other in a direction perpendicular to a plane extending through the axes of rotation of said supporting means, commensurate with any deviations of the gear to be tested from true tooth configuration, a pair of rotatable sheaves spaced apart, an endless tape-like movement transmission means passing around each of said pulley members and around said sheaves for effecting said shifting movements, said sheaves being positioned so as to hold the transmission means in a pair of similar loops with the adjacent legs of said loops parallel, and forming with said legs a loop around the pulley member supported by the slide adjoining said sheaves, and an indicating device adapted to receive said movement of said slide means and having motion multiplying mechanism for visually indicating said shifting movements in multiplied proportion.

3. In an apparatus for testing gears, two rotatable supporting means adapted each to support a gear intermeshing with the other gear at a certain ratio of gearing, a pulley connected to each of said gear supporting means for rotating said gears in opposite directions to each other at a ratio of gearing corresponding to that of said supporting means, slide means carrying one of said gear supporting means for shifting the pulley member carried thereby relative to the other in a direction perpendicular to a plane extending through the axes of rotation of said supporting means, commensurate with any deviations of the gear to be tested from true tooth configuration, an endless tape-like movement transmission means passing around each of said pulley members and around two associated tape sheaves, for effecting said shifting movements, means for adjusting said sheaves in accordance with the size of the gear to be tested and the length of said transmission means, means for fixing said adjusting means in position of adjustment, and an indicating device adapted to receive said movement of said slide means and having motion multiplying mechanism for visually indicating said shifting movements in multiplied proportion.

4. In an apparatus for testing gears, two rotatable supporting means adapted each to support a gear intermeshing with the other gear at a certain ratio of gearing, a pulley connected to each of said gear supporting means for rotating said gears in opposite directions to each other at a ratio of gearing corresponding to that of said supporting means, slide means carrying one of said gear supporting means for shifting the pulley member carried thereby relative to the other in a direction perpendicular to a plane extending through the axes of rotation of said supporting means, commensurate with any deviations of the gear to be tested from true tooth configuration, an endless tape-like movement transmission means passing around each of said pulley members and around two associated tape sheaves for effecting said shifting movements, an indicating device adapted to receive said movement of said slide means, recording means in said device, and driving means for actuating said recording means and the gear driving the pair of intermeshing gears.

KARL MÜLLER.

REFERENCES CITED

The following references are of record in the file of this patent:

UNITED STATES PATENTS

| Number | Name | Date |
| --- | --- | --- |
| 1,263,472 | Saurer | Apr. 23, 1918 |
| 1,374,698 | Wilkinson | Apr. 12, 1921 |
| 1,394,324 | Matthews | Oct. 18, 1921 |
| 1,911,435 | Condon | May 30, 1933 |